United States Patent [19]
Urakami

[11] 4,029,164
[45] June 14, 1977

[54] MOVABLE APPARATUS ADHERING TO THE SURFACE OF A WALL

[75] Inventor: Fukashi Urakami, Fukuoka, Japan

[73] Assignee: Sanko Co., Ltd., Fukuoka, Japan

[22] Filed: Dec. 22, 1975

[21] Appl. No.: 643,398

[30] Foreign Application Priority Data
Dec. 28, 1974 Japan .............. 50-50315

[52] U.S. Cl. ............... 180/1 VS; 51/429; 114/222

[51] Int. Cl.² ............ B62D 63/02; B60S 3/02

[58] Field of Search .......... 180/1 VS, 8 BA, 8 D, 180/8 C, 8 R, 1 R; 51/9 M; 114/222

[56] References Cited
UNITED STATES PATENTS

| | | | |
|---|---|---|---|
| 2,878,882 | 3/1959 | Bernotas | 180/8 BA |
| 2,914,127 | 11/1959 | Ricouard | 180/8 C |
| 3,366,192 | 1/1968 | Tourneau | 180/8 D |
| 3,682,265 | 8/1972 | Hiraoka et al. | 51/9 M X |
| 3,777,834 | 12/1973 | Hiraoka et al. | 114/222 X |
| 3,810,515 | 5/1974 | Ingro | 180/1 VS |
| 3,859,948 | 1/1975 | Romano et al. | 114/222 |
| 3,864,876 | 2/1975 | Diehn | 51/9 M |
| 3,906,572 | 9/1975 | Winn | 114/222 |
| 3,946,692 | 3/1976 | Sierra et al. | 114/222 |

*Primary Examiner*—Joseph F. Peters, Jr.
*Assistant Examiner*—J. D. Rubenstein
*Attorney, Agent, or Firm*—Frank J. Jordan

[57] ABSTRACT

A movable apparatus adhering to the surface of a wall which is capable of moving continuously and smoothly on the hull of a ship or the wall of a modern architectural structure such as a sky-scraper without the danger of falling.

14 Claims, 15 Drawing Figures

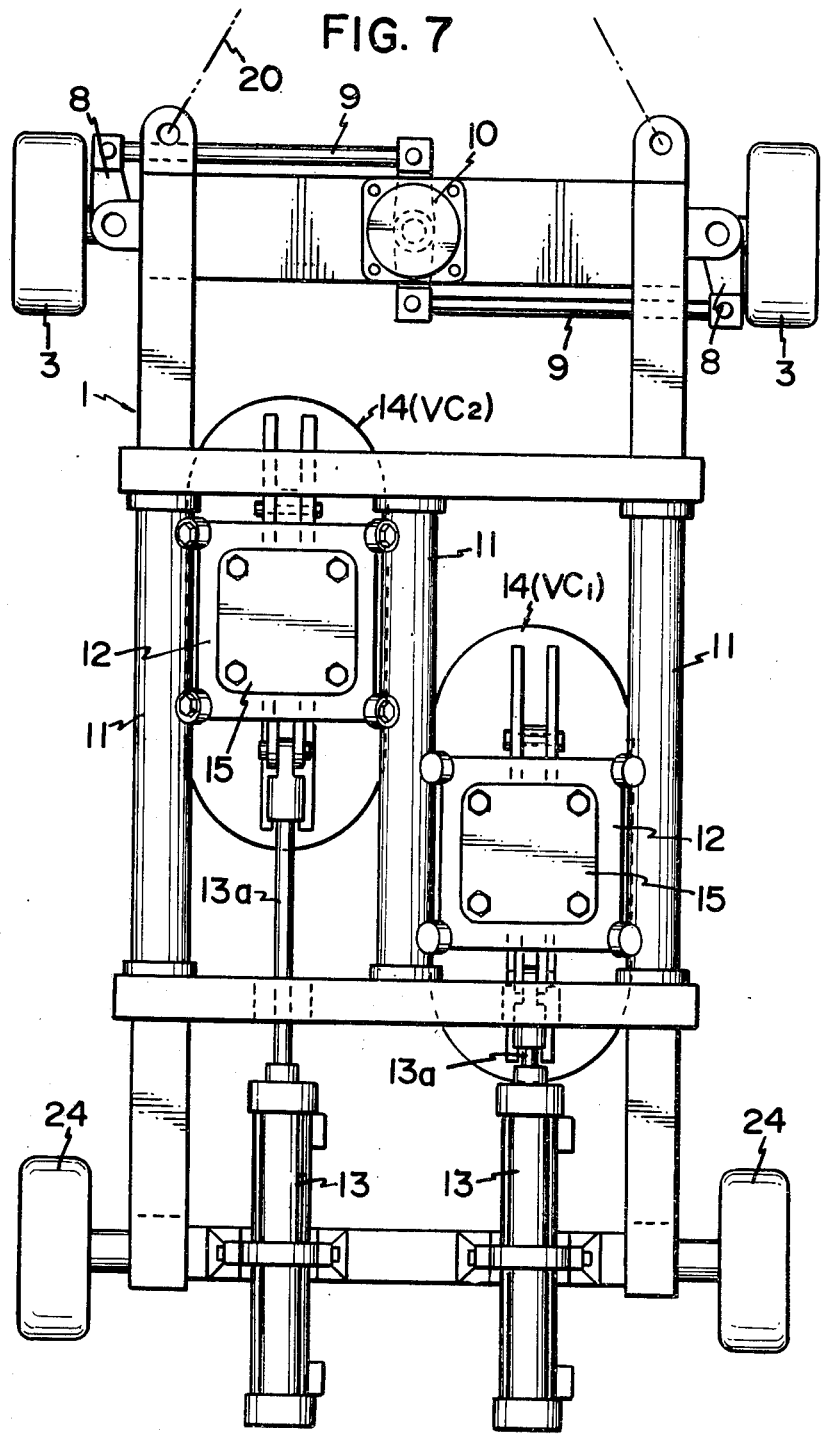

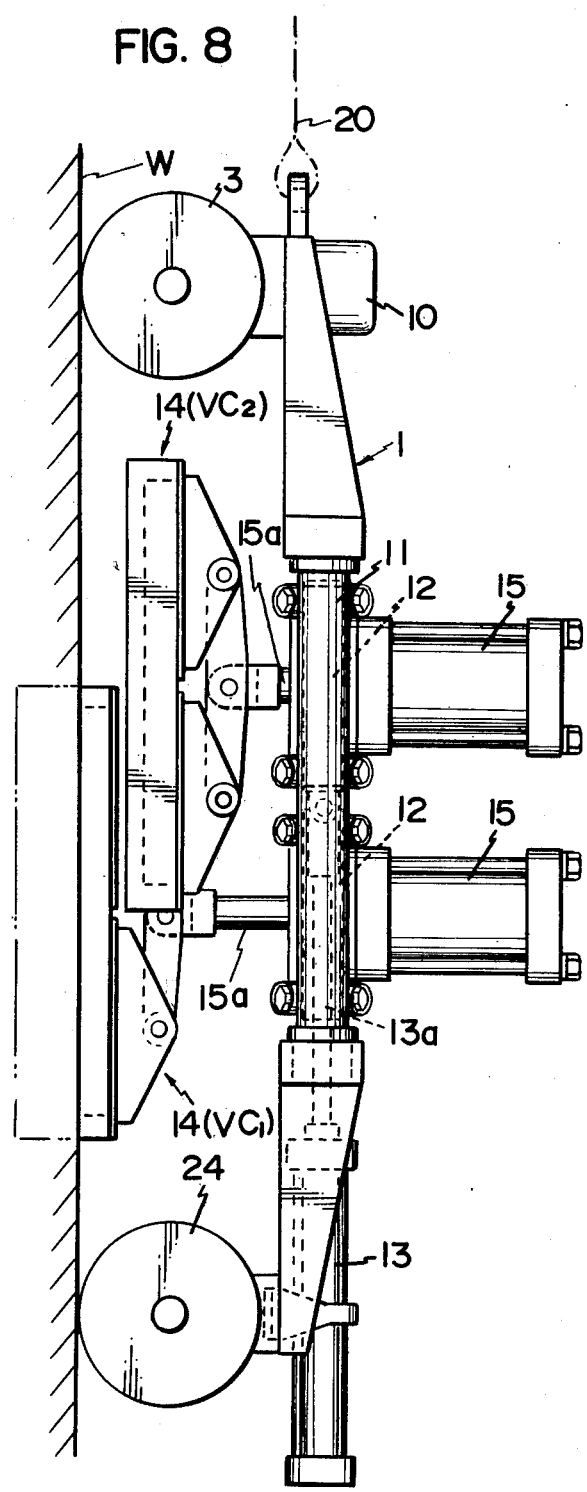

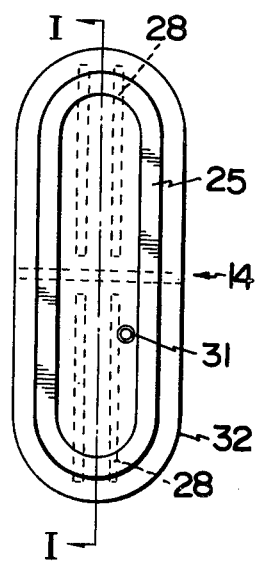
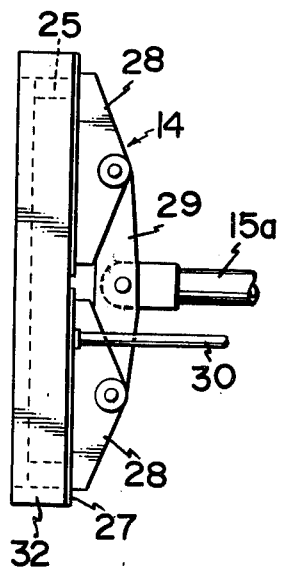
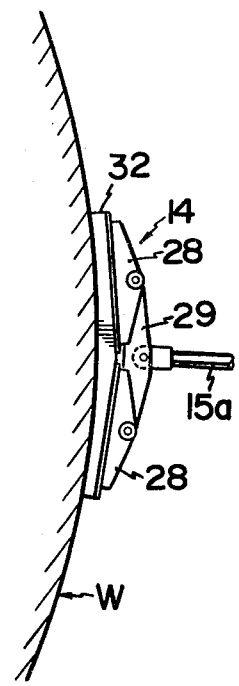
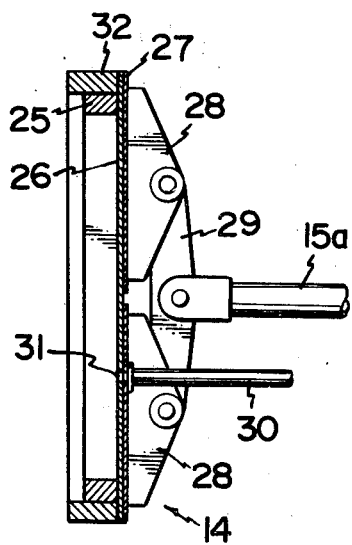
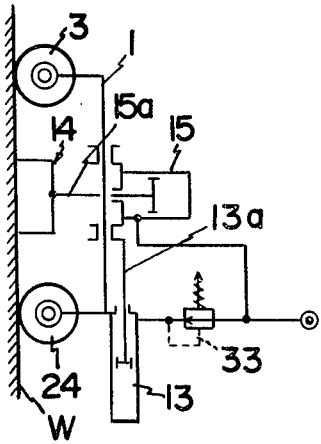

MOVABLE APPARATUS ADHERING TO THE SURFACE OF A WALL

BACKGROUND OF THE INVENTION

This invention relates to an apparatus which is capable of moving on a vertical wall while adhering to the surface of the wall.

The inventor has disclosed a movable apparatus which is capable of adhering to the surface of a wall in Japanese Pat. application Ser. No. Sho 49-110129. The above apparatus, however, is movable along a wall by four magnetic or suction adhering members which are operated by remote control and alternately adhere to and separate from the wall in pairs to move the apparatus in the desired direction on a vertical or inclined wall; however, the adhering force for each adhering member cannot be increased and the movement of the apparatus is intermittent due to the parallelogramatic relationship of the adhering members.

Accordingly, the above apparatus is less than optimal with respect to safety and reliability.

For example, during the operation of scouring the rust from a wall with an abrasive brushing device which is mounted on the movable apparatus, if the adhering force is insufficient, the rust cannot satisfactorily be removed and there is the danger that the entire apparatus may separate from the wall and fall due to the vibrations of the rust-removing device.

To be more specific, during the operation of the apparatus which has a plurality of rotatable abrasive discs that are mounted between the surface to be cleaned and the apparatus, the apparatus must be stationary until one pair or the other of the wall adhering members complete the adhering operation. This implies that the apparatus moves only intermittently due to the time required to adhere and remove the wall-adhering members to and from the wall. Therefore, the surface of the wall is not uniformly scoured due to the intermittent operation.

It is an object of the present invention to provide an apparatus which is capable of eliminating the above-mentioned faults.

It is another object of the present invention to provide a movable apparatus capable of adhering to a wall with a greater number of wall-adhering members than conventional apparatuses so that the safety and reliability of the operation of the apparatus is enhanced while continuous motion of the apparatus can be achieved.

It is a further object of the present invention to provide a movable apparatus adhering to a wall having a plurality of suction cups as the wall-adhering members so that a strong or sufficient adhering force can be achieved with each cup even when the wall is made of non-magnetic material or when electro-magnetic force is not available due to the condition of the surface of the wall, i.e., the wall is coated with thick paint or the wall has been heavily corroded.

It is still a further object of the present invention to provide a movable apparatus capable of adhering to a wall which has a mechanism that exerts an additional force to that which is necessary to balance the overall weight of the apparatus. This mechanism can be effectively employed especially in the case when the apparatus moves in a vertical direction along the surface of the wall. Due to this mechanism, the adhering force which is necessary to cause the apparatus to adhere to the wall can be substantially reduced.

This apparatus substantially comprises a body which is capable of moving along the wall, a plurality of wall-adhering members which can be moved in the same direction as that of the body and a mechanism which makes the wall-adhering members adhere to and separate from the surface of a wall.

The operations of making the wall-adhering members adhere to and separate from the wall, changing the position of the wall-adhering member actuating the pneumatic cylinder to press the wall-adhering members onto the surface of the wall which occur in a predetermined sequence are performed on each adhering member.

BRIEF DESCRIPTION OF THE DRAWINGS

FIG. 7 is a plan view of the apparatus of FIG. 6.

FIG. 8 is a side view of the apparatus of FIG. 6.

FIG. 9 is a plan view of the suction cup which is employed in the foregoing apparatuses.

FIG. 10 is a side view of the suction cup of FIG. 9.

FIG. 11 is a cross-sectional view of the suction cup taken on line I—I of FIG. 9.

FIG. 12 is a side view of the suction cup which is capable of adhering to the surface of a curved wall.

FIG. 13 is an explanatory view showing the principle of the method which utilizes the horizontal cylinder to exert additional force to the balance the force of the cylinder and the overall weight of the apparatus.

DETAILED DESCRIPTION OF THE INVENTION

Figure 1:
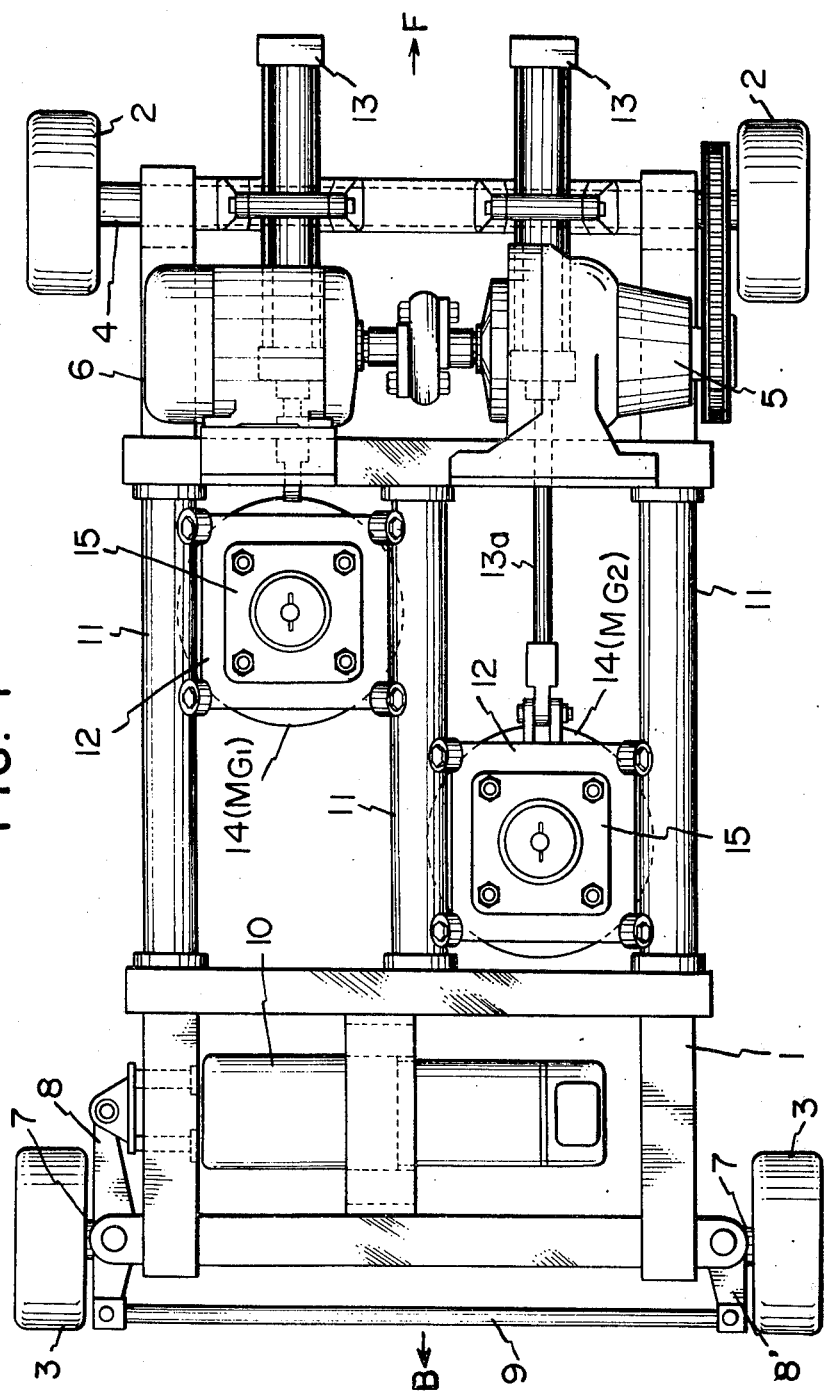
FIG. 1 is a plan view of the apparatus of the first embodiment of this invention.

The apparatus of the first embodiment of this invention is hereinafter described in great detail in conjunction with the attached drawings FIG. 1 through FIG. 4.

The movable apparatus of this embodiment includes a power-operated device such as an electric or air motor which drives the apparatus and causes it to move along the surface of a wall.

Referring to FIG. 1 through FIG. 4, a truck-like body 1 has two driving wheels 2 and two guide wheels 3 at the front and rear of the body 1 respectively. A driving wheel 2 is attached to either end of a shaft 4 which in turn is driven by a driving means 6 such as an air or power-operated motor by using a speed reducing device 5. The driving means 6 and speed reducing device are both mounted on the body 1 in a place next to the driving shaft 4. Levers 8 and 8' are connected at right angles to shaft 7 and are positioned such that one lever is adjacent to each guide wheel 3. Lever 8 is pivotally attached at its center while lever 8' is attached at one end. A rod 9 connects the other end of lever 8' and the corresponding end of lever 8. The other end of lever 8 is pivotally connected to the end of the actuating rod of a pneumatic cylinder 10 that is attached to the body 1 and is disposed parallel to the shaft 7 and is capable of directing the apparatus by changing the position of the guide wheels 3 by employing the principle of the parallelogram, using the parallelogram which is formed by the shaft 7, connecting rod 9 and levers 8,8'. A necessary number of guide means 11 are disposed within the frame parallel to the length of the body 1. A flat base 12 which is capable of sliding in the same direction of motion as that of the apparatus is disposed between each pair of guide means 11. The distal end of the actuating rod 13a of pneumatic cylinder 13 which is attached to the drive-side end of the body 1 is connected to one side of the base 12 and causes the base 12 to slide along guide means 11. A pneumatic cylinder 15 is fixedly attached to the top of the base 12 in such a way that the actuating rod 15a thereof is disposed down through and below the bottom of the base. A wall-adhering member 14 is rotatably attached to the distal end of the actuating rod 15a of the cylinder 15. A compression spring 16 is disposed over the actuating rod 15a with one end secured to the top of the wall-adhering member while other end is free.

Figure 5:
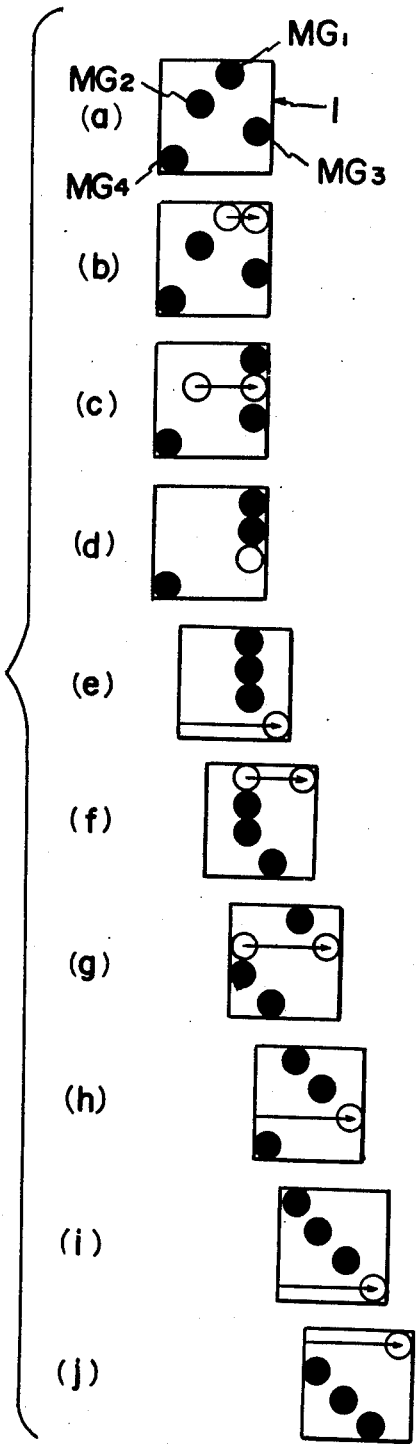
FIG. 5 is an explanatory representation showing the adhering movement of a modification of the apparatus of FIG. 1 which has four wall-adhering members.
Figure 6:
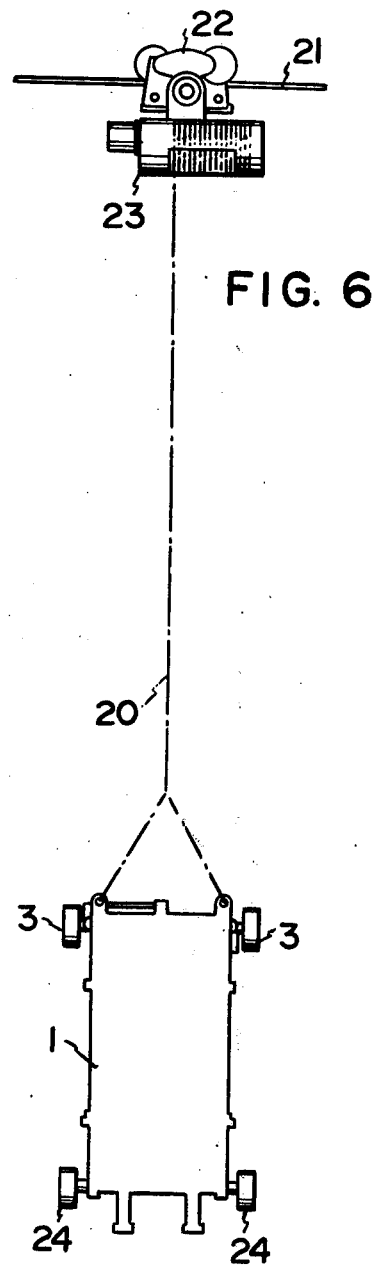
FIG. 6 is an explanatory view of the apparatus of a second embodiment which is suspended by a rope means and employs suction cups as the all-adhering members.

Although in this embodiment of the apparatus two electro-magnets, $MG_1$, $MG_2$ are employed as the wall-adhering members as shown in FIG. 5, the apparatus is capable of employing a plurality of wall-adhering members if desired.

In the case where a wall is made of non-magnetic material such as concrete or plastic, suction cups or pads are used in place of electro-magnets, wherein the adhering and releasing of the apparatus from the wall is performed by the suction and the discharge of air.

The length of the stroke of the actuating rod 15a of the cylinder 15 is chosen such that when the rod 15a is extended halfway or is at midstroke the surface of the wall-adhering member comes into contact with the surface of the wall. Therefore, the apparatus is capable of moving in a desired direction while being steadily secured to the surface of the wall by the force which is caused by the inner pressure of the cylinder 15 although the actuating rod 15a does not move any further forward.

The manner in which this apparatus is operated is hereinafter disclosed in conjunction with attached drawings, FIG. 1 through FIG. 5.

Figure 4:
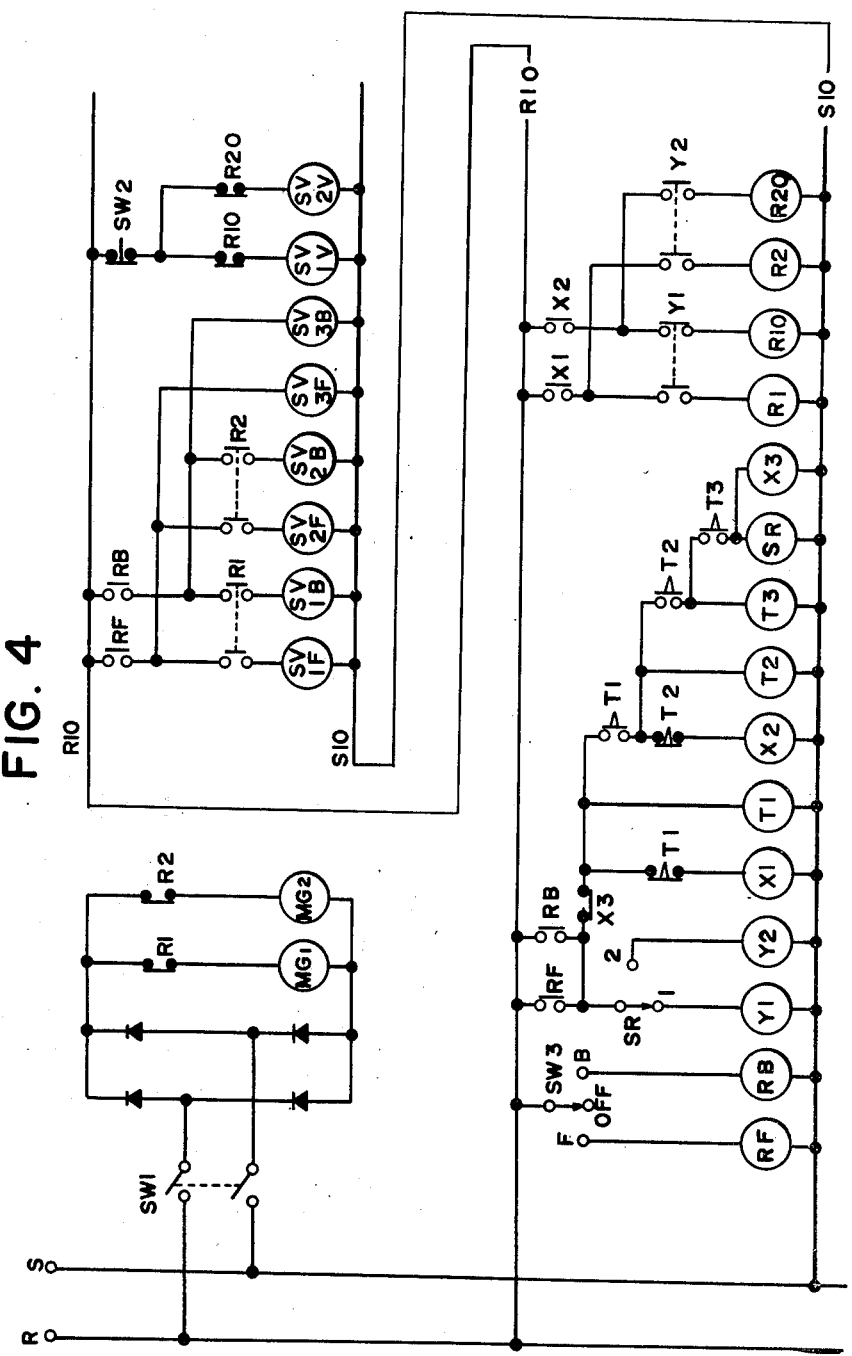
FIG. 4 is the electric circuit diagram used by the apparatus of FIG. 1.

First the electro-magnets $MG_1$ and $MG_2$ which act as wall-adhering members 14 are both energized by switching on the power-supply switch $SW_1$ which is shown in FIG. 4 and the power supply switch which extends the electro-magnets $SW_2$ is switched off. Then the two position- three port solenoid valves $SV_1V$ and $SV_2V$ are both energized to change their positions so that both pneumatic cylinders 15 are opened to the atmosphere by way of exhaust ports whereby the actuating rods 15a of both cylinders 15 extend toward the wall due to the compression spring means 16 and cause both electro-magnets $MG_1$ and $MG_2$ to adhere to the surface of the wall.

Then the solenoid valves $SV_1V$ and $SV_2V$ are energized to change their positions so that compressed air is charged into both cylinders 15 whereby the electro-magnets $MG_1$ and $MG_2$ tend to be pulled upward and the body of the apparatus is strongly urged toward the wall while being supported by the driving wheels 2 and guide wheels 3.

At this stage the electro-magnets $MG_1$ and $MG_2$ are irregularly disposed within the body 1.

To move the apparatus forward F (toward the right in FIG. 1) or backward B (toward the left in FIG. 1), electromagnets $MG_1$ and $MG_2$ are slidably moved along the guide means 11 in the direction that corresponds to that of the apparatus.

Figure 3:
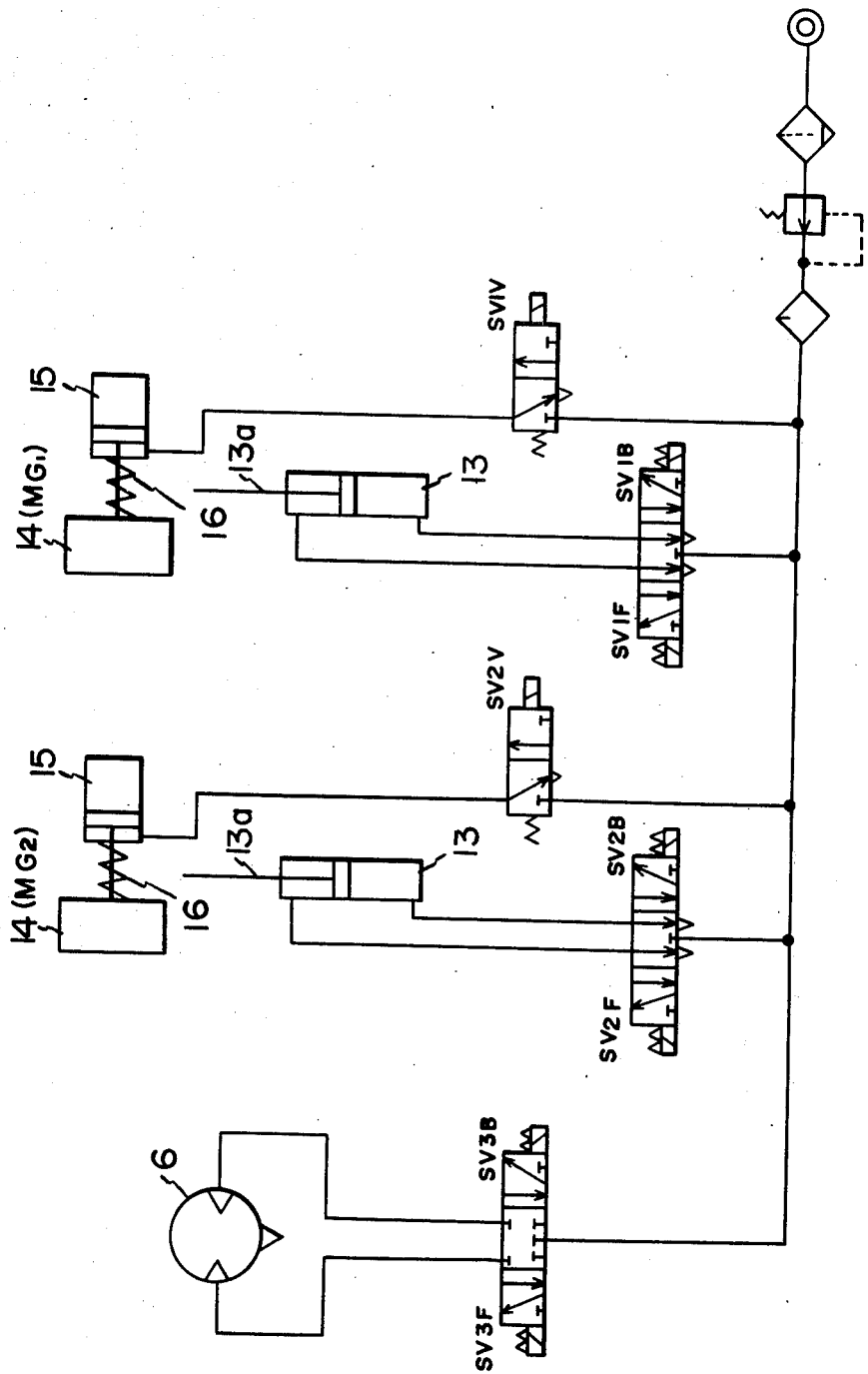
FIG. 3 is the pneumatic circuit diagram used by the apparatus of FIG. 1.

For that purpose, refering to FIG. 3, 5 port-3 position solenoid valves, $SV_1$ and $SV_2$, which have normal open center are energized to change position to $SV_1F$ and $SV_2F$ when moving the apparatus toward the right, or $SV_1B$ and $SV_2B$ when moving the apparatus toward the left and thereby activating pneumatic cylinders 13.

For example in FIG. 4, when switch $SW_3$, which is employed to move the apparatus, is switched to position F, the relay RF is activated so that the solenoid valve $SV_3F$ is energized to change position and the air motor 6 rotates in a clockwise direction.

In this case, when the rotary brush of the stepping relay SR is connected to contact 1, since the make contact RF is closed, i.e., switched on, relay $R_2$ and $X_1$ are energized, thereby closing the contact $X_1$ and energizing relay $R_1$. As relay $R_1$ is energized the break contact $R_1$ is opened; i.e., switched off whereby the electro-magnet $MG_1$ is de-energized while the electro-magnet $MG_2$ is kept energized.

As soon as electro-magnet $MG_1$ is de-energized, the actuating rod 15a of the pneumatic cylinder 15 retracts in opposition to the force of the bias spring 16 to remove the electro-magnetic $MG_1$ to a predetermined distance from the surface of the wall since the 2-position-3-port solenoid valve $SV_1V$ is kept energized. Simultaneously, since 3-position-5-port solenoid valve $SV_1$ is energized, the pneumatic cylinder 13, which moves the electro-magnet $MG_1$, is charged with air to cause the actuating rod 13a to retract whereby electro-magnet $MG_1$ mounted on the base 12 is moved along the guides 11.

When the predetermined contact time of timer $T_1$ which is activated together with the relay $X_1$ lapses, the break contact $T_1$ is opened, i.e., switched off, and the relays $X_1$ and $R_1$ are de-energized so that the break contact $R_1$ is switched on and the electro-magnet $MG_1$ is again energized while the make contact $R_1$ is switched off and the above-mentioned solenoid valve $SV_1F$ is de-energized and changes position to the normal open center thereof.

As soon as the electro-magnet $MG_1$ is energized, the relay $X_2$ is switched on which causes relay $R_{10}$ to be energized so that the break contact $R_{10}$ is switched off so as to de-energize the 2-position-3-port solenoid valve $SV_1V$ whereby the electro-magnet $MG_1$ is extended toward the surface of a wall W by means of the bias spring 16 and adheres to the wall W.

When the predetermined contact time (usually about 0.5 second) of the timer $T_2$ which is activated together with the relay $X_2$ lapses, the break contact $T_2$ is switched off and the relay $X_2$ and relay $R_{10}$ are de-energized so that the break contact $R_{10}$ is switched on whereby the 2-position-3-port solenoid valve $SV_1V$ is again energized to urgedly press the body of the apparatus to the surface of a wall.

When the predetermied time (usually about 0.5 second) of the timer $T_3$ lapses, the make contact $T_3$ is switched on and subsequently the relay $X_3$ is energized so that the break contact $X_3$ is switched off and all contacts $T_1$, $T_2$ and $T_3$ of timers $T_1$, $T_2$ and $T_3$ return to their original positions. Simultaneously the stepping relay SR is energed so that the rotary brush of SR changes its position from 1 to 2 and the relay $Y_2$ is energized instead of the realy $Y_1$. After the relay $Y_2$ is energized, a series of operations which are the same as those which follow the energizing of the relay $Y_1$ are repeated wherein electro-magnet $MG_1$ is de-energized and moved along the guides 11. During the above movement of either electro-magnet $MG_1$ or $MG_2$, the body is kept moving forward along the wall by the drive wheels 2 which are powered by an air motor 6. Since the 3-position-5-port solenoid valve which regulates the flow of the air to the cylinder 13 that moves electro-magnet $MG_2$ is positioned at the normal open center during the above movement, the cylinder has its both ports open to the atmosphere whereby the actuating rod 13a of cylinder 13 is able to extend corresponding to the forward movement of the apparatus.

By the repetition of the alternate movments of the electro-magnet $MG_1$ and $MG_2$ coupled with the driving of the body by the air motor, the body is kept moving to the right (forward).

It is noted that the contact time of each timer $T_1$, $T_2$ or $T_3$, is to be determined such that the operation to remove the electro-magnet $MG_1$ or $MG_2$, the operation to move the magnet along the guides and the operation to adhere the magnet to the surface of a wall are conducted in a sequence which is matched to the moving speed of the apparatus. In other words, the operations to remove the electro-magnet $MG_1$ and $MG_2$ from the wall to move the magnet along the guide 11 and to extend and adhere the magnet onto the wall are to be conducted within a period of time which is necessary to move the apparatus a desired distance by the setting of the timers $T_1$, $T_2$ and $T_3$. Thereby the body 1 or the apparatus steadily adheres to the surface of the wall and is capable of continuous movement along the wall without the intermittent movement which has afflicted the conventional apparatuses.

The above operations can be conducted by making use of a plurality of limit switches which may be attached to the apparatus in the appropriate places.

Operations to move the apparatus backward B (to the left in FIG. 1) are the same as those required to move the apparatus forward with the exception of the initial operation to change the switch $SW_3$ to B contact. Therefore, an explanation of these operations is omitted.

In FIG. 4, the electric circuit diagram which remotely controls the above operations is shown wherein $SW_1$ indicates a power supply switch to energize the electro-magnets, $SW_2$ is a switch to extend and remove the magnets from the wall and $SW_3$ is a switch to move the apparatus.

In order to change the direction of movement of the apparatus, the pneumatic cylinder 10 is actuated so that the guide wheels chage to a diagonal position with respect to the body.

Since there is a necessary clearance between the interval of each pair of guides and the width of the base, the apparatus is capable of moving while forming a gradually curved path.

In this embodiment, to simplify the explanation of the construction of the apparatus and the manner of operation thereof, only two electro-magnets are employed. It is to be noted, however, that the apparatus is capable of employing a plurality of electro-magnets wherein the manner of operation of the apparatus which employs four electro-magnets is briefly disclosed hereinafter in order to describe the advantages of the apparatus of this embodiment.

Refering to FIG. 5 where the apparatus moves to the right. (a) indicates an operation where the apparatus adheres to the wall with all four electro-magnets located randomly with respect to the shape of the body. Since the electro-magnet $MG_4$ is disposed at the leftmost portion of the body, the body cannot move until magnet $MG_4$ is moved to the right. (b) shows the operation where the electromagnet $MG_1$ is de-energized while other magnets are kept energized and is moved along the guides to the rightmost portion of the body. (c) shows the operation where the electro-magnet $MG_2$ is de-energized while other magnets are energized and is also moved to the rightmost portion of the body. (d) shows the operation where the electro-magnet $MG_3$ is de-energized while other magnets are energized, however, this magnet $MG_3$ cannot move since it is disposed at the rightmost portion of the body from the beginning. Through the above operations the body does not move since electro-magnet $MG_4$ is kept energized and adheres to the wall at the leftmost portion of the body.

Subsequently as shown in (e), $MG_4$ is de-energized while other magnets are kept energized and is moved toward the right and the body is now also simultaneously moved toward the right by the driving means such as an air motor. (f) shows an operation where the electro-magnet $MG_1$ is de-energized and moved toward the rightmost portion of the body while the body is simultaneously moved to the right in a way described with respect to (e). Similar operations with respect to $MG_2$, $MG_3$, $MG_4$ are shown (g), (h) and (i) in FIG. 5 respectively. In (i), all the electro-magnets $MG_1$, $MG_2$, $MG_3$ and $MG_4$ are aligned diagonally with respect to the shape of the body. After the completion of the above diagonal alignment of magnets, the apparatus is moved continuously and smoothly to the right repeating the above relationship of the electro-magnets.

SECOND EMBODIMENT

The apparatus of the second embodiment is described in detail in conjunction with the attached drawings, FIGS. 6 through 12.

This is a hoisted apparatus which is raised and lowered vertically along the wall W by a wire rope 20 which is reeled into a hoist 23 that is attached to a trolley means 22 which in turn is moved horizontally along the upper part of the wall guided by transverse guide rails 21.

Furthermore the apparatus of this embodiment employs suction cups $VC_1$ and $VC_2$ as wall-adhering members 14 in place of the electro-magnets of the first embodiment.

In FIG. 7 and FIG. 8, the same numerals are used to indicate the parts or members of the apparatus which correspond to those of the apparatus of the first embodiment.

Refering to FIG. 7, the front wheels are the guide wheels 3 and the rear wheels are the support wheels 24. However, the rear wheels 24 are not driven since the apparatus is moved by the hoist. The guide wheels are steered by a power operated motor 10 which is attached to the body instead of the pneumatic cylinder of the apparatus of the first embodiment.

As shown in FIG. 9 through FIG. 11, the suction cups $VC_1$ or $VC_2$ generally have an elongated elliptical configuration and are flexible at the central portion thereof. However, the cups may have some other configuration, such as circular or rectangular so long as the cup can be successfully attached to the curved surface of a wall.

For this purpose, in this embodiment, the suction cup mainly comprises an elliptical cup 25 which is preferably made of synthetic rubber, a pair of metal attachment plates 27 which are symmetrically attached to the bottom plate 26 of the cup 25 wherein the central strip portion of the bottom plate 26 is not covered by either plated 27, a vertical lug 28 is fixedly attached to the surface of plate 27 and a support plate 29 extends between the vertical lugs 28 such that each side of the plate 29 is connected to the top portion of either lug 28 and has a central portion to which the distal end of the actuating rod 15a of the pneumatic cylinder 15 is pivotally attached. Since the central strip portion of the cup 25 is not covered by the metal plates, the cup is pushed inward when the actuating rod 15a is extended. A flexible suction tube 30 communicates with the inner recess of cup 25 through an outlet 31 which formed in the bottom plate 26. In order to restrict to a desired amount of the deformation of the cup which is caused by pressing the cup onto the surface of a wall W, the compression member 32 which is made of a material with less hardness than that of cup 25 is attached to the outer periphery of the cup 25. Thereby the contact surface of the compression material 32 is slightly longer and extends slightly beyond the edge of the rubber portion of the cup 25.

In short, if the suction cup of this apparatus which is made of an elastic material such as synthetic rubber comes directly into contact with the surface of a wall, over a long period of time permanent deformation or stain of the cup may occur since the deformation caused by extending the actuating rod 15a is considerable. Therefore, elastic materials which differ in hardness are employed to eliminate the above possible defect.

Accordingly as shown in FIG. 12, since the suction cups $VC_1$ and $VC_2$ have the above-mentioned construction, the cups can come into contact with the surface of a curved wall in an air-tight manner since they are flexible at the central portion.

Construction of other parts of the apparatus of this embodiment is exactly the same as that of the apparatus of the first embodiment, therefore, the explanation of the above parts may be referred to the first embodiment.

With respect to the movement of the apparatus of this embodiment, it is the same as that of the apparatus of the first embodiment with the exception of the employing of suction cups $VC_1$ and $VC_2$ instead of electromagnets $MG_1$ and $MG_2$ and in place of an air motor, the hoist 22 which is equipped with a trolley means 22 to raise and lower the apparatus by reeling in and out the wire rope 20 is employed.

Although the construction and the mode of operation of the apparatus in both the first and second embodiments have been disclosed heretofore, the relationship between the frictional force of the drive wheel with respect to the surface of the wall and the weight of the apparatus has not been disclosed. The above relationship becomes particularly important when the apparatus includes a device such as an air motor which drives the apparatus along the wall vertically or at an angle of 60° with respect to the vertical.

If the frictional force of the drive wheels which occurs as the wheels are pressed on the surface of the wall and driven by a motor mounted on the apparatus exceeds the weight of the apparatus, the apparatus can smoothly move upward or downward along the wall without the wheels slipping.

In order that a clearer understanding of the above relationship is possible, the following formulae are given.

It is to be noted, however, that for convenience all wheels are treted as drive wheels in the formulae.

In the formulae, the overall weight of the apparatus is indicated by $W(kg)$, the adhering force of the wall-adhering member is indicated by $F(kg)$, the output force of the pneumatic cylinder (the force which urgedly presses the drive wheels onto the surface of the wall) is indicated by $P_1(kg)$, the frictional coefficient between the surface of the wall which is made of iron and the tread of the wheels which is made of rubber is determined as 0.5 and the safety ratio is determined as 2.

Frictional force of the drive wheel $P_1 \times 0.5 = 2W$ (1)

Adhering force of the wall-adhering member $F = 2 P_1$ (2)

From the above formulae (1) and (2)

$F = 8W \quad P_1 = 4W$

This means that if the apparatus is raised or lowered along the surface of a wall only by means of the frictional force of the drive wheels, the adhering force of the wall-adhering members has to be eight times greater than the overall weight of the apparatus. One way to decrease this necessary adhering force is achieved by making use of the frictional force between the wall-adhering members and the surface of a wall.

To be more specific, decreasing the necessary adhering force can be easily achieved by the use of the pneumatic cylinder which changes the position of the wall-adhering member with respect to the body. The pneumatic cylinder for moving the wall-adhering member is given additional force to move the body in an upward direction after the wall-adhering members adhere to the surface of the wall.

It is to be noted, however, that the driving force of this cylinder is kept constant and less than the frictional force between the wall-adhering member and the surface of the wall.

For that purpose, a reducing valve 33 with a relief is attached to the middle of the air supply tube in order to supply air to the cylinder when the inner pressure thereof is decreased corresponding to the upward movement of the apparatus and to release air from the relief port when the inner pressure is in excess of the desired value.

The amount of desired adhering force of the wall-adhering members which is necessary when the above method is applied is calculated in the following formulae where the wall-adhering member is an electromagnet or suction cup.

In the formulae $P_2(kg)$ is the output force of the pneumatic cylinder which moves the adhering member horizontally, the frictional coefficient between the surface of a wall made of iron and an electro-magnet made of iron is 0.1, the frictional coefficient of the surface of the wall made of iron and the suction cup made of rubber is 0.5 and the safety ratio is 2.

1. when the wall-adhering member is an electro-magnet.

$P_1 \times 0.5 + P_2 = 2W$ (4)
$2P_2 = (F - P_1) \times 0.1$ (5)
$P_1 = (F/2)$ (6)

From the above formulae, (4),(5) and (6);

$$F = 7\frac{3}{11} W, P_1 = 3\frac{7}{11} W, P_2 = \frac{2}{11} W$$

2. When the wall-adhering member is a suction cup;
$$P_1 \times 0.5 + P_2 = 2W \quad (7)$$
$$2P_2 = (F - P_1) \times 0.5 \quad (8)$$
$$P_1 = (F/2) \quad (9)$$

From the above formulae (7), (8) and (9);

$$F = 5\frac{1}{3} W, P_1 = 2\frac{2}{3} W, P_2 = \frac{2}{3} W$$

When the wall-adhering members are electro-magnets, it can be understood from above calculations that the desired adhering force F is not substantially different from when only frictional force is used; but when the wall-adhering members are suction cups, the desired adhering force F is two-thirds of that of the case where pneumatic cylinder and reducing valve are not applied.

Figure 14:
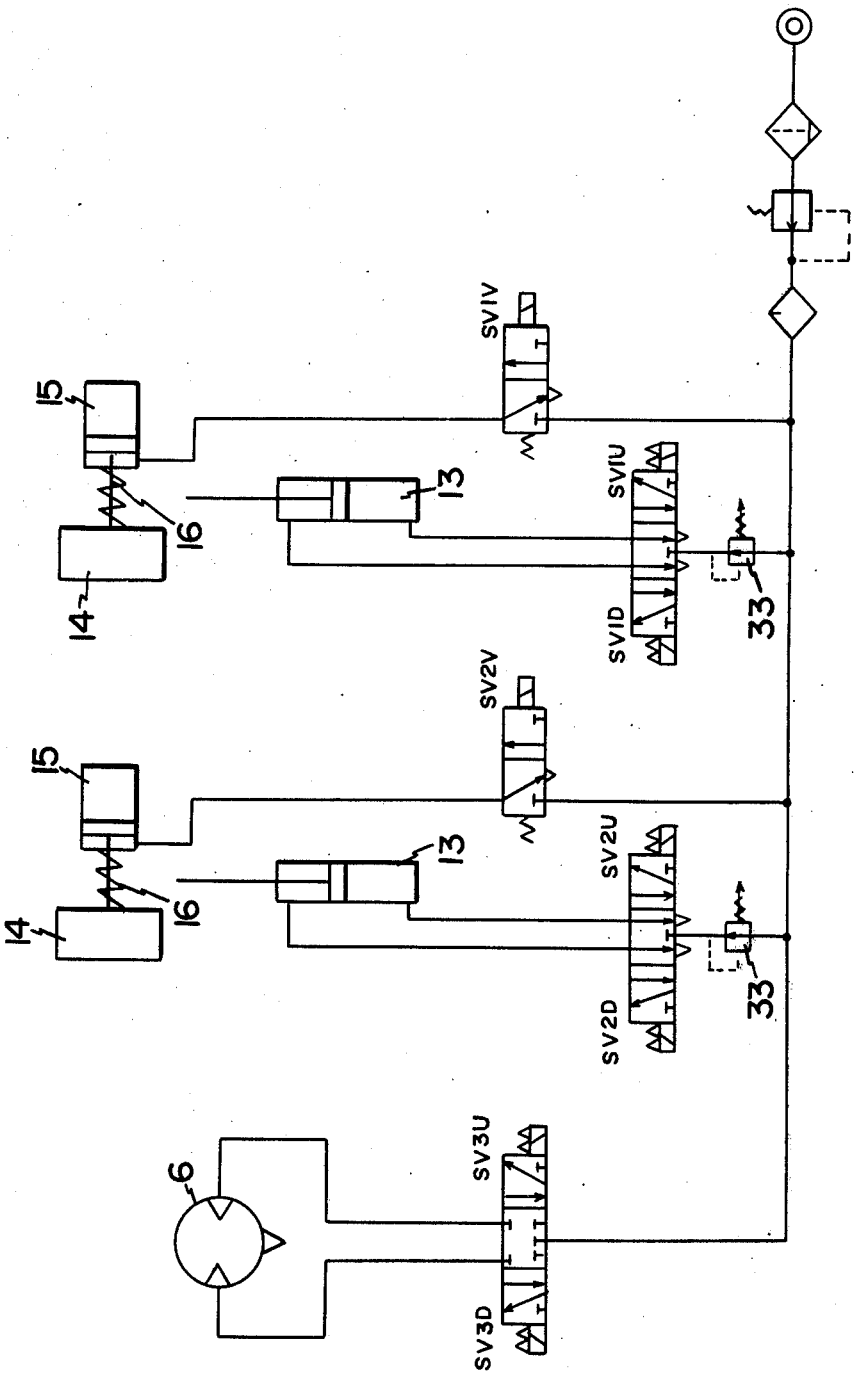
FIG. 14 is a pneumatic circuit diagram used in the apparatus of FIG. 13.
Figure 15:
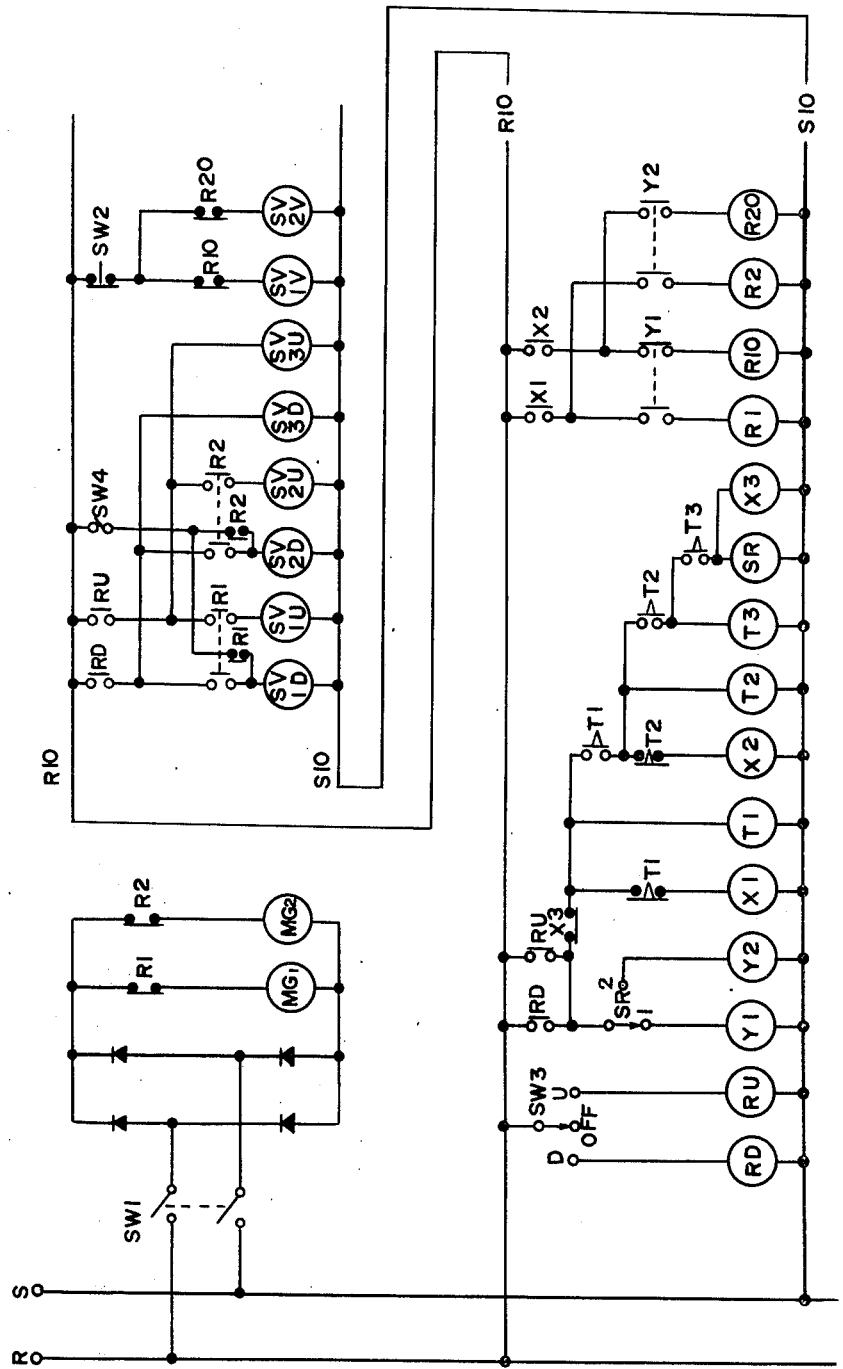
FIG. 15 is an electric circuit diagram used in the apparatus of FIG. 13.

In FIG. 13, the principle of method for exerting additional force for balancing the overall weight of the apparatus by employing pneumatic cylinders to move the electro-magnets along the guides is shown. A device which is capable of the above balancing operation also can be separately mounted onto the apparatus. In the drawings numeral 33 indicates a reducing valve with a relief port, and other numerals indicate the parts of the apparatus which correspond to those of above-mentioned apparatus. FIG. 14 and FIG. 15 show the pneumatic circuit diagram and the electric circuit diagram which are employed in the above balancing method.

Figure 2:
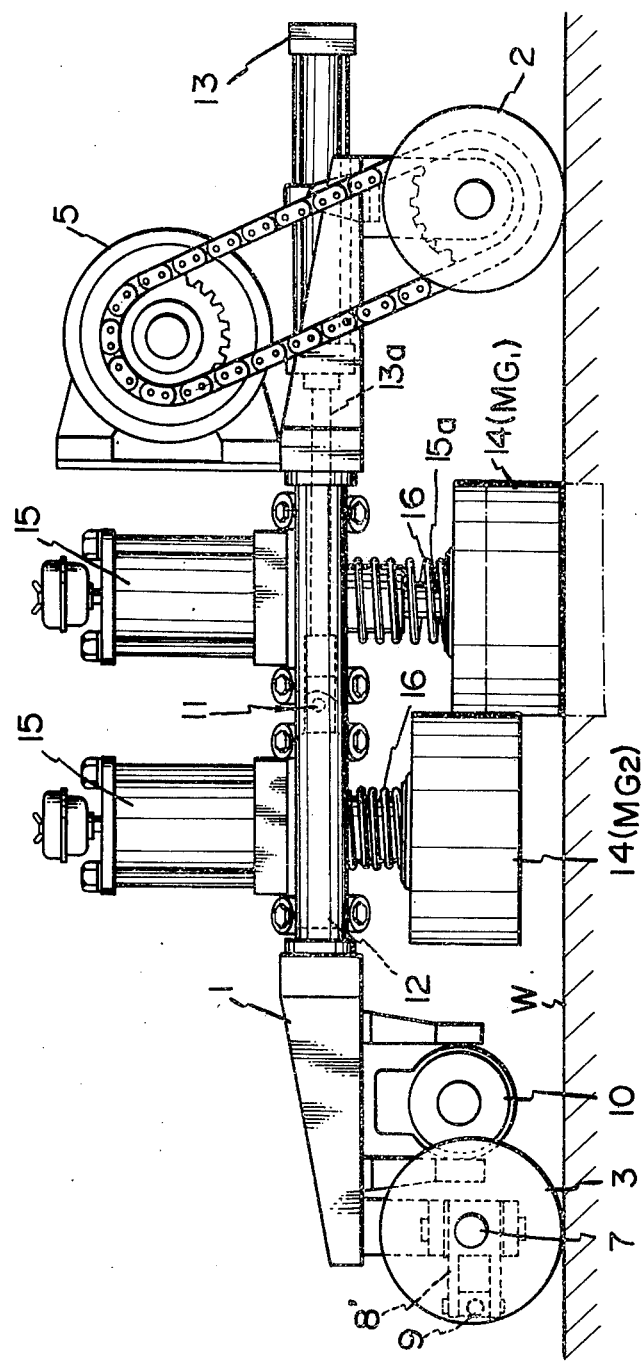
FIG. 2 is a side view of the apparatus of FIG. 1.

In FIG. 13, the drive wheel 2 and guide wheels 3 of the apparatus of FIG. 2 are regarded as the rear wheels and front wheels respectively and the left direction of FIG. 2 is regarded as the upward direction.

Accordingly in FIG. 14 and FIG. 15, U indicates an upward direction while D indicates a downward direction.

In FIG. 15, $SW_4$ indicates a switch which can cause a force to be exerted in addition to the driving force and is switched on only when the apparatus is raised or lowered along the wall. This siwtching operation is explained in conjunction with FIGS. 1 and 2 wherein the left direction is regarded as the upward direction as mentioned above.

In FIG. 15, when the switch $SW_3$ is switched to U contact, the power-operated motor 6 is rotated in a counter clockwise direction and the relays RU, $Y_1$ and $X_1$ are energized so that the break contact $R_1$ is switched off whereby the electro-magnet $MG_1$ is de-energized. Simultaneously 3-position-5-port solenoid valve $SV_1U$ is energized so that the air is supplied to the pneumatic cylinder 13 to extend the actuating rod 13a whereby the electro-magnet $MG_1$ is raised along the guides 11.

After the predetermined time of timer $T_1$ lapses, electro-magnet $MG_1$ extends and adheres to the wall. Since the switch $SW_4$ is switched on, the 3-position-5-port solenoid valve $SV_1D$ which is employed to regulate the cylinder 13 is also energized so that the cylinder is supplied with air to retract its actuating rod 13a whereby force for moving the body 1 of the apparatus upward is exerted.

When it is desired to lower the apparatus, after the predetermined time of the timer $T_1$ lapses, electro-magnet $MG_1$ extends and adheres to the wall while air is simultaneously charged into the cylinder 13 in the same manner as is employed to move the apparatus upward. However, in this case, corresponding to the lowering of the body 1, the inner pressure of the cylinder 13 is maintained within the predetermined pressure by operating the reducing vavle 33 which has a relief port.

As mentioned above, so long as the wall-adhering member adheres to the wall, the cylinder 13 is always charged with air by way of the reducing vavle so that even when the actuating rod 13a of the cylinder 13 extends and retracts corresponding to the movement of the body 1, the inner pressure of cylinder 13 is always kept constant by the reducing valve. Thereby the overall weight of the apparatus is balanced and sustained.

The operation to adhere the wall-adhering members 14 to the surface of a wall, the operation to move the members along the guides and the operation to remove the members from the wall are the same as those of the apparatus of the first embodiment. Therefore, their explanation is omitted.

According to this invention, as has been described in great detail, an apparatus which is movable while adhering to the surface of a wall has the following advantages;

1. The adhering force of the wall-adhering member can be increased by the employment of a pneumatic cylinder so that there is no fear that the apparatus may suddenly fall. Therefore the apparatus can move smoothly and securely while adhering to the wall.

2. The apparatus is capable of moving continuously without interruptions in the movement thereof.

3. The apparatus can be equipped with a device or mechanism which exerts the force to maintain the overall weight of the apparatus by using a balancing method. Therefore, the adhering force of the wall-adhering members can be substantially reduced which results in a compact movable apparatus.

4. As shown in FIG. 5, since the number of wall adhering members which can be kept adhering to the surface of the wall while the apparatus is moving is increased, the substantial adhering force of the apparatus is improved.

What is claimed is:
1. Apparatus movably adhering to an upright wall comprising a body, driven wheels mounted on said body adapting said body to travel along said wall, wall-adhering devices selectively operable to an adhering condition or a releasing condition, operable means for extending and retracting said wall-adhering devices relative to said body in a direction generally perpendicular to said wall, and actuating means movably mounting said wall-adhering devices on said body for movement in the general traveling direction of said body, whereby said body in the direction of travel travels along said wall on said driven wheels as one wall-adhering device in its adhering and extending condition adheres to said wall and another wall-adhering device while in its released and retracted condition is moved relative to said body in the direction of travel by said actuating means.

2. Apparatus according to claim 1 wherein said actuating means are slidably mounted on said body such that during said one operational condition, said body slides relative to said one wall-adhering device as the latter is temporarily fixedly adhered to said wall while simultaneously said actuating means slides said other released and retracted wall-adhering device on said body.

3. Apparatus according to claim 1 wherein said actuating means comprises a cylinder-piston device operably disposed between each of said wall-adhering devices and said body.

4. Apparatus according to claim 1 wherein said operable means comprises a cylinder-piston device operable to extend and retract each of said wall-adhering devices in a direction generally perpendicular to said wall said cylinder-piston device being mounted on a base element, said base element being slidable on said body in the traveling direction of said body.

5. Apparatus according to claim 4 wherein said operable means further comprises a spring means for extending each of said wall-adhering devices and urging the latter into contact with said wall.

6. Apparatus according to claim 4 wherein said wheels contact said wall such that said body travels on said wheels, said cylinder-piston device being operably disposed between said body and said wall-adhering device such that the reactional force of the fluid pressure applied to said cylinder-piston device serves to forcibly urge said wheels into contact with said wall.

7. Apparatus according to claim 1 further comprising drive means on said body for driving said wheels to thereby move said body on said wall.

8. Apparatus according to claim 1 further comprising means for steering said wheels to control the direction of movement of said body.

9. Apparatus according to claim 1 wherein said wall-adhering devices are electro-magnets.

10. Apparatus according to claim 1 wherein said body is adapted to be moved along said wall on said wheels by means of an external power source.

11. Apparatus according to claim 1 wherein said wall-adhering devices are vacuum-adhering members.

12. Apparatus according to claim 11 wherein each of said vacuum-adhering members comprises a generally elliptical cup element made of a resilient material, a compression member attached to the outer periphery of said cup element, said compression member being made of a resilient material which is softer than the resilient material out of which said cup element is made, said cup element having an outer peripheral edge, said compression member projecting beyond said peripheral edge.

13. Apparatus according to claim 12 further comprising pair of spaced attachment plates attached to the back of said cup element with the space between said attachment plates being generally centrally disposed relative to said cup element, lug members affixed to each of said attachment plates, a support element extending between said lug members and pivotally connected to the latter, said operating means being connected to said support element, whereby when said cup element is urged against a wall surface, said cup element is adapted to flex to accommodate itself to variously configured wall surfaces as said cup element adapts itself to said variously configured wall surfaces and said cup element bends at said centrally disposed space and said lug elements pivot on their respective pivotal connection with said support element.

14. Apparatus according to claim 12 further comprising a back plate on said cup element, said attachment plates being secured to said back plate.

* * * * *